US012619910B2

(12) United States Patent
Liu et al.

(10) Patent No.: US 12,619,910 B2
(45) Date of Patent: May 5, 2026

(54) MACHINE LEARNING PIPELINE WITH VISUALIZATIONS

(71) Applicant: FUJITSU LIMITED, Kawasaki (JP)

(72) Inventors: Lei Liu, San Jose, CA (US); Wei-Peng Chen, Fremont, CA (US)

(73) Assignee: FUJITSU LIMITED, Kawasaki (JP)

( * ) Notice: Subject to any disclaimer, the term of this patent is extended or adjusted under 35 U.S.C. 154(b) by 1073 days.

(21) Appl. No.: 17/707,853

(22) Filed: Mar. 29, 2022

(65) Prior Publication Data

US 2023/0316123 A1     Oct. 5, 2023

(51) Int. Cl.

| | |
|---|---|
| *G06N 20/20* | (2019.01) |
| *G06F 18/214* | (2023.01) |
| *G06F 18/24* | (2023.01) |
| *G06F 18/40* | (2023.01) |
| *G06N 3/02* | (2006.01) |
| *G06N 20/00* | (2019.01) |
| *G06F 8/10* | (2018.01) |
| *G06F 8/34* | (2018.01) |
| *G06F 8/41* | (2018.01) |
| *G06F 9/48* | (2006.01) |

(Continued)

(52) U.S. Cl.

CPC ........... *G06N 20/00* (2019.01); *G06F 18/214* (2023.01); *G06F 18/24765* (2023.01); *G06F 18/40* (2023.01); *G06F 8/10* (2013.01); *G06F 8/34* (2013.01); *G06F 8/41* (2013.01); *G06F 9/4881* (2013.01); *G06F 9/548* (2013.01); *G06N 3/045* (2023.01); *G06N 3/08* (2013.01); *G06N 3/10* (2013.01)

(58) Field of Classification Search

CPC .......... G06N 20/00; G06N 3/10; G06N 3/045;
G06N 3/08; G06F 18/40; G06F 18/214;
G06F 18/24765; G06F 9/38; G06F
9/4881; G06F 9/548; G06F 8/34; G06F
8/10; G06F 8/41

See application file for complete search history.

(56) References Cited

U.S. PATENT DOCUMENTS

| | | | |
|---|---|---|---|
| 10,963,475 B2 * | 3/2021 | Chakra | ................... G06F 16/26 |
| 11,074,107 B1 | 7/2021 | Nandakumar | |

(Continued)

OTHER PUBLICATIONS

Felix Mohr et al., Predicting Machine Learning Pipeline Runtimes in the Context of Automated Machine Learning, IEEE, Sep. 2021, [Retrieved on Dec. 2, 2025]. Retrieved from the internet: <URL: https://ieeexplore.ieee.org/stamp/stamp.jsp?tp=&arnumber=9347828> 12 Pages (3055-3066) (Year: 2021).*

Saha et al., "SapientML: Synthesizing Machine Learning Pipelines by Learning from Human-Written Solutions", Arxiv.org, Cornell University Library, Feb. 18, 2022.

(Continued)

*Primary Examiner* — Anibal Riveracruz

(74) *Attorney, Agent, or Firm* — Maschoff Brennan

(57) ABSTRACT

A method may include obtaining a machine learning (ML) pipeline including a plurality of functional blocks within the ML pipeline. The method may also include using the ML pipeline as an input to a visualization predictor, where the visualization predictor may be trained to output one or more visualization commands based on relationships between the visualization commands and the functional blocks within the pipeline. The method may additionally include invoking the visualization commands to instantiate the ML pipeline with visualizations generated by the one or more visualization commands.

18 Claims, 7 Drawing Sheets

(51) Int. Cl.

| | |
|---|---|
| G06F 9/54 | (2006.01) |
| G06N 3/045 | (2023.01) |
| G06N 3/08 | (2023.01) |
| G06N 3/10 | (2006.01) |

(56) References Cited

U.S. PATENT DOCUMENTS

| | | | | |
|---|---|---|---|---|
| 2019/0324968 | A1* | 10/2019 | Kelly | G06N 20/00 |
| 2021/0110288 | A1* | 4/2021 | Poothiyot | G06F 8/20 |
| 2021/0303625 | A1* | 9/2021 | McLeod | G06F 16/9538 |
| 2022/0019947 | A1* | 1/2022 | Mitelman | G06N 20/00 |
| 2022/0067575 | A1* | 3/2022 | Saha | G06N 20/00 |
| 2022/0277219 | A1* | 9/2022 | Tora | G06N 3/088 |
| 2022/0351055 | A1* | 11/2022 | Anand | G06N 3/088 |
| 2022/0405314 | A1* | 12/2022 | Du | G06F 40/56 |
| 2023/0177388 | A1* | 6/2023 | Cornec | G06N 20/00 706/11 |
| 2023/0297625 | A1* | 9/2023 | Ojo | G06N 3/09 |

OTHER PUBLICATIONS

Spinner et al., "explAIner: A Visual Analytics Framework for Interactive and Explainable Machine Learning", arxiv.org, Cornell University Library, Jul. 29, 2019.

European Search Report issued in corresponding application No. 23155313.2, dated Aug. 16, 2023.

Dibia, Victor, and Çağatay Demiralp. "Data2vis: Automatic generation of data visualizations using sequence-to-sequence recurrent neural networks." IEEE computer graphics and applications 39.5 (Jun. 24, 2019): 33-46.

Q. Wang et al., "A Survey on ML4VIS: Applying Machine Learning Advances to Data Visualization," IEEE Transactions on Visualization and Computer Graphics (Dec. 23, 2021).

K. Hu, et al. "VizML: A Machine Learning Approach to Visualization Recommendation". In CHI Conference on Human Factors in Computing Systems Proceedings (CHI 2019), May 4-9, 2019.

Y. Luo, X. Qin, N. Tang, and G. Li. "DeepEye: Towards Automatic Data Visualization". The 34th IEEE International Conference on Data Engineering (ICDE), Oct. 25, 2018.

* cited by examiner

*600*

Obtain ML Pipeline    *610*

Use ML Pipeline As Input To Visualization Predictor To Output Visualization Commands    *620*

Instantiate ML Pipeline With Visualization Commands Embedded Therein    *630*

MACHINE LEARNING PIPELINE WITH VISUALIZATIONS

FIELD

The embodiments discussed in the present disclosure are related to a machine learning pipeline with visualizations.

BACKGROUND

Machine learning (ML) generally employs ML models that are trained with training data to make predictions that automatically become more accurate with ongoing training. ML may be used in a wide variety of applications including, but not limited to, traffic prediction, web searching, online fraud detection, medical diagnosis, speech recognition, email filtering, image recognition, virtual personal assistants, and automatic translation.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

One or more embodiments of the present disclosure may include a method that includes obtaining a machine learning (ML) pipeline including a plurality of functional blocks within the ML pipeline. The method may also include using the ML pipeline as an input to a visualization predictor, where the visualization predictor may be trained to output one or more visualization commands based on relationships between the visualization commands and the functional blocks within the pipeline. The method may additionally include invoking the visualization commands to instantiate the ML pipeline with visualizations generated by the one or more visualization commands.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
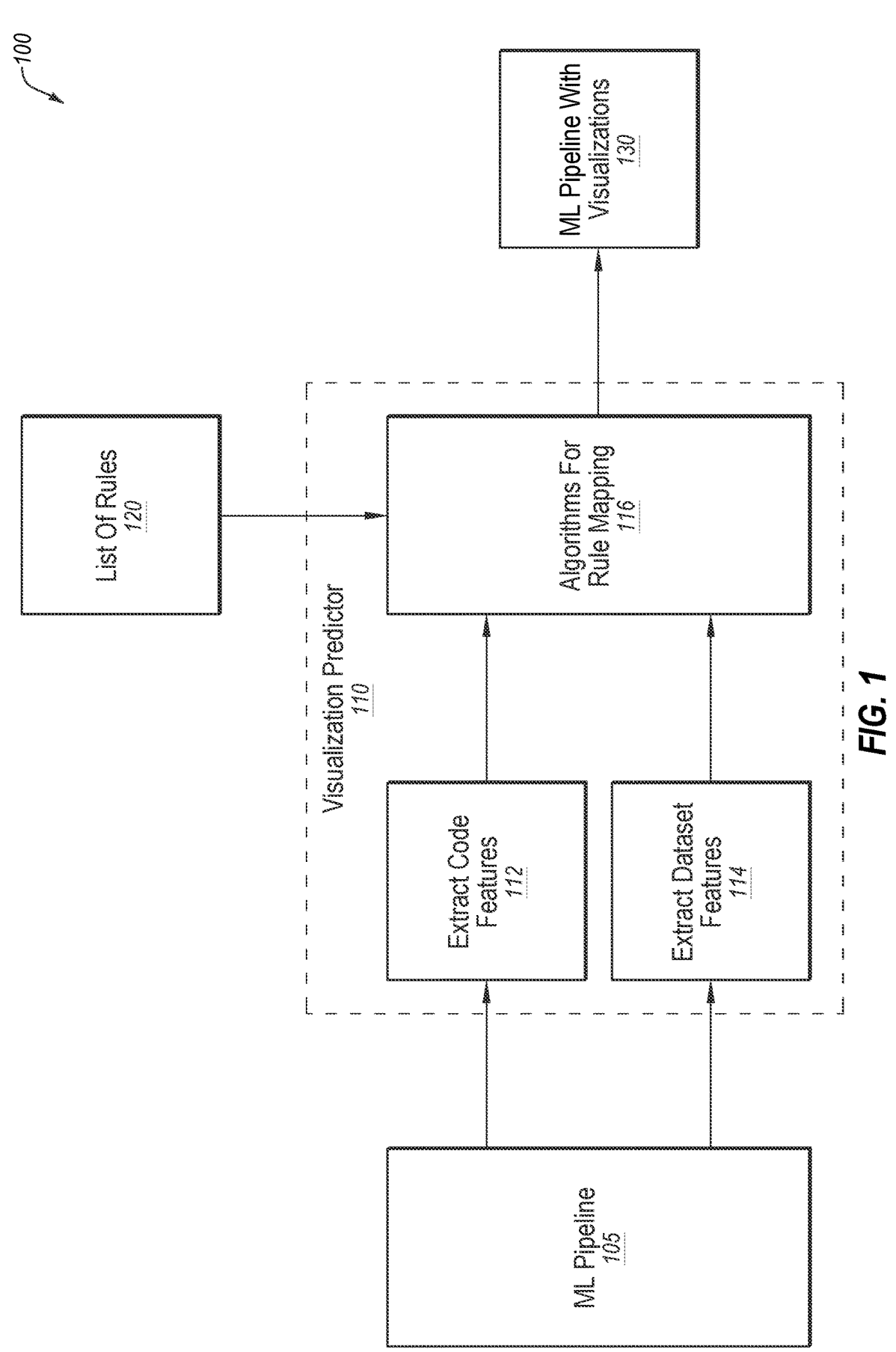
FIG. 1 is a diagram representing an example system for generating machine learning pipelines that include visualizations.

Some embodiments described in the present disclosure relate to methods and systems of generating Machine Learning (ML) pipelines that include visualizations.

As ML has become increasingly common, there is often a scarcity of ML experts (e.g., skilled data scientists) available to implement new ML projects. Although various AutoML solutions (e.g. Auto-Sklearn, AutoPandas, etc.) have been proposed to resolve the ever-growing challenge of implementing new ML projects with a scarcity of ML experts, current AutoML solutions offer only simplistic and partial solutions that are insufficient to enable non-experts to fully implement new ML projects. Further, although open source software (OSS) databases of existing ML projects (e.g., Kaggle, GitHub, etc.) have also been proposed as another solution for the challenge of implementing new ML projects by non-experts, it may be difficult or impossible for a non-expert to find a potentially useful existing ML project in these databases. Further, even if the non-expert should succeed in finding a potentially useful existing ML project in these databases, it can be difficult or impossible for the non-expert to modify the potentially useful existing ML project for the new requirements of a new ML project.

In the present disclosure, the term "ML project" may refer to a project that includes a dataset, an ML task defined on the dataset, and an ML pipeline (e.g., a script or program code with a series of functional blocks) that is configured to implement a sequence of operations to train a ML model, on the dataset, for the ML task and use the ML model for new predictions.

In the present disclosure reference to "functional blocks" may refer to operations that may be performed by the ML pipelines in which a particular functional block may correspond to a particular type of functionality. Further, each functional block may be instantiated in its corresponding ML pipeline with a particular code snippet configured to cause execution of the functionality of the corresponding functional block. In many instances, a same functional block across different ML pipelines may have different instantiations in each of the different ML pipelines.

In some embodiments, upon receipt of a new dataset and a new ML task for a new ML project, such as from a non-expert data scientist, the computer system may automatically use a hierarchical approach to first synthesize a functional block-level pipeline for the new ML project using an ML model. One example of such ML pipeline generation may be described in U.S. application Ser. No. 17/183,724 ("MACHINE LEARNING PIPELINE SKELETON INSTANTIATION"), which is hereby incorporated by reference in its entirety. Additionally or alternatively, the computer system may obtain the ML pipeline via another mechanism (e.g., from a user input). The ML pipeline may indicate which functional blocks may be used for the new ML project.

After obtaining the new ML pipeline, the computing system may utilize the new ML pipeline as an input to a visualization predictor. The visualization predictor may identify one or more visualization commands that may be helpful in explaining the functions in the ML pipeline and/or may facilitate the exploration of which functions to be used in the ML pipeline. The ML pipeline may then be instantiated with the visualizations.

In some embodiments, code features and/or dataset features may be extracted from the new ML pipeline, and those features may be compared by the visualization predictor to a set of developed rules to identify the visualization commands and/or their associated parameters.

The rules may be developed by using a training dataset of existing ML projects that include visualizations in their respective ML pipelines. By analyzing the relationships between the meta-features of the precursor datasets used to train the ML pipelines of the training dataset and the visualizations, some rules may be obtained. Additionally or alternatively, by observing the order in which the visualizations occur with respect to certain code features, other rules may be obtained.

Embodiments of the present disclosure are explained with reference to the accompanying drawings.

FIG. 1 is a diagram representing an example system 100 for generating machine learning pipelines that include visualizations, in accordance with one or more embodiments of the present disclosure. The system 100 may include an ML pipeline 105 that is obtained to be augmented with one or more visualizations. The system 100 may include a visualization predictor 110, with programming or other components to extract run time code features and extract run time dataset features of a run time dataset used to train the ML pipeline 105, and may additionally include algorithms for rule mapping 116. The system 100 may include a list of rules 120 to facilitate prediction of visualization commands. The system 100 may include an ML pipeline with visualizations 130 as instantiated after input from the visualization predictor 110.

In operation, the ML pipeline 105 may be provided to the visualization predictor 110. The visualization predictor 110 may extract run time code features via the code feature extracting component 112 and extract run time dataset features via the dataset feature extracting component 114. An example of such extraction may be described in greater detail with reference to FIG. 3. Using the code and dataset features along with the rules 120, the visualization predictor 110 may apply algorithms for rule mapping 116. Such mapping may identify one or more rules that are applicable based on the code features and/or dataset features. The rules may facilitate prediction of one or more visualization commands and/or their parameters to produce visualizations associated with the ML pipeline 105 that may be beneficial or desirable to accompany the ML pipeline 105. After obtaining the visualization commands and/or parameters, the commands may be invoked to generate the visualizations such that the ML pipeline 105 may be produced as the ML pipeline with visualizations 130. An example of such a process may be described with reference to FIG. 4.

The ML pipeline 105 may include any list or set of functional blocks or commands that are trained on a training dataset to perform a given task. For example, for a Titanic predicting process to predict whether or not a passenger would have survived on the Titanic, the ML pipeline 105 may include a series of functional blocks to perform preprocessing on a dataset (e.g., the actual passengers on the Titanic and data about them) for training the ML pipeline 105 and a model to perform the actual analysis to predict whether or not a given input set of data related to a person would have survived on the Titanic. In some embodiments, the ML pipeline 105 may be generated by an automatic ML project generation tool. Additionally or alternatively, the ML pipeline 105 may be manually created by a data scientist or other user.

By way of example, the ML pipeline 105 may include a sequence of application programming interface (API) calls, such as to recall a raw training dataset (e.g., pandas-.read_csv( )), imputer to fill out missing values (e.g., sklearn.impute.SimpleImputer( ), pandas.fillna( )), an encoder operation to encode various data values and/or change the ordinality of data (e.g., sklearn.preprocessing.OrdinalEncoder( ), sklearn.preprocessing.OneHotEncoder( )), a standardizer operation to standardize data (e.g., sklearn-.preprocessing.StandardScaler( ), sklearn.preprocessing-.MinMaxScaler( )), a dimensionality reducer operation (e.g., sklearn.decomposition.PCA( ), sklearn.discriminant_analysis.LinearDiscriminantAnalysis( )), an estimator operation to actually perform the prediction or other task of the ML pipeline 105 (e.g., sklearn.linear_model. LogisticRegression( ), catboost.CatBoostClassifier( )), and/or other ML-related APIs, such as drop( ), train_test_split( ), fit( ) among others.

In some embodiments, the ML pipeline 105 may include electronic data that includes a training dataset, an ML task defined on the dataset (for example, a classification problem or a regression problem of the ML task, the target column in the training dataset for prediction, among others), and sequence of functional blocks (e.g., as a script or series of snippets of program code) that is configured to implement a sequence of operations to train an ML model for the ML task and to use the ML model for new predictions. In some embodiments, the ML pipeline 105 may include a computational notebook, which may be a computational structure used to develop and/or represent the corresponding ML pipelines, especially during the development phase. One example of a computational notebook is a Jupyter notebook.

The visualization predictor 110 may include any computer program, series of computer programs, programmatically implemented operations, or any other devices or components configured to predict visualization commands that may be beneficial to the ML pipeline 105. For example, the generated visualizations may provide insight into why a certain functional block was included, or an aspect or feature of the dataset that led to a certain functional block, among other benefits. In some embodiments, the visualization commands may include an API call or other similar programmatic command to generate a visualization based on input data. In some embodiments, the visualization commands may include the parameters upon which the visualizations are to be based (e.g., which data fields in the training data are depicted in the visualization generated by invoking the visualization command). Stated another way, the visualization predictor 110 may not only predict what type of plot to be plotted, but what data to plot as well.

The list of rules 120 may include any set of conditional statements that relate one or more conditions to a particular visualization or property of a visualization. The list of rules 120 may include confidence values for each of the conditional relationships. An example of generating such rules may be described with reference to FIGS. 2 and/or 5.

After generating the predictions, the visualization commands may be embedded within the ML pipeline to instantiate the ML pipeline with visualizations 130. The ML pipeline with visualizations 130 may be stored as an updated ML pipeline, such as a Jupyter Notebook, as Python programming code including the visualization commands embedded within the code, or as any other computer-readable and/or human readable programming code with the visualization commands included.

As used herein, the term "run time" may refer to code features, data features, training datasets, or other aspects of the ML pipeline as illustrated in FIG. 1 in which the ML pipeline is being analyzed and augmented with visualizations.

Modifications, additions, or omissions may be made to FIG. 1 without departing from the scope of the present disclosure. For example, the system 100 may include more or fewer elements than those illustrated and described in the present disclosure.

Figure 2:
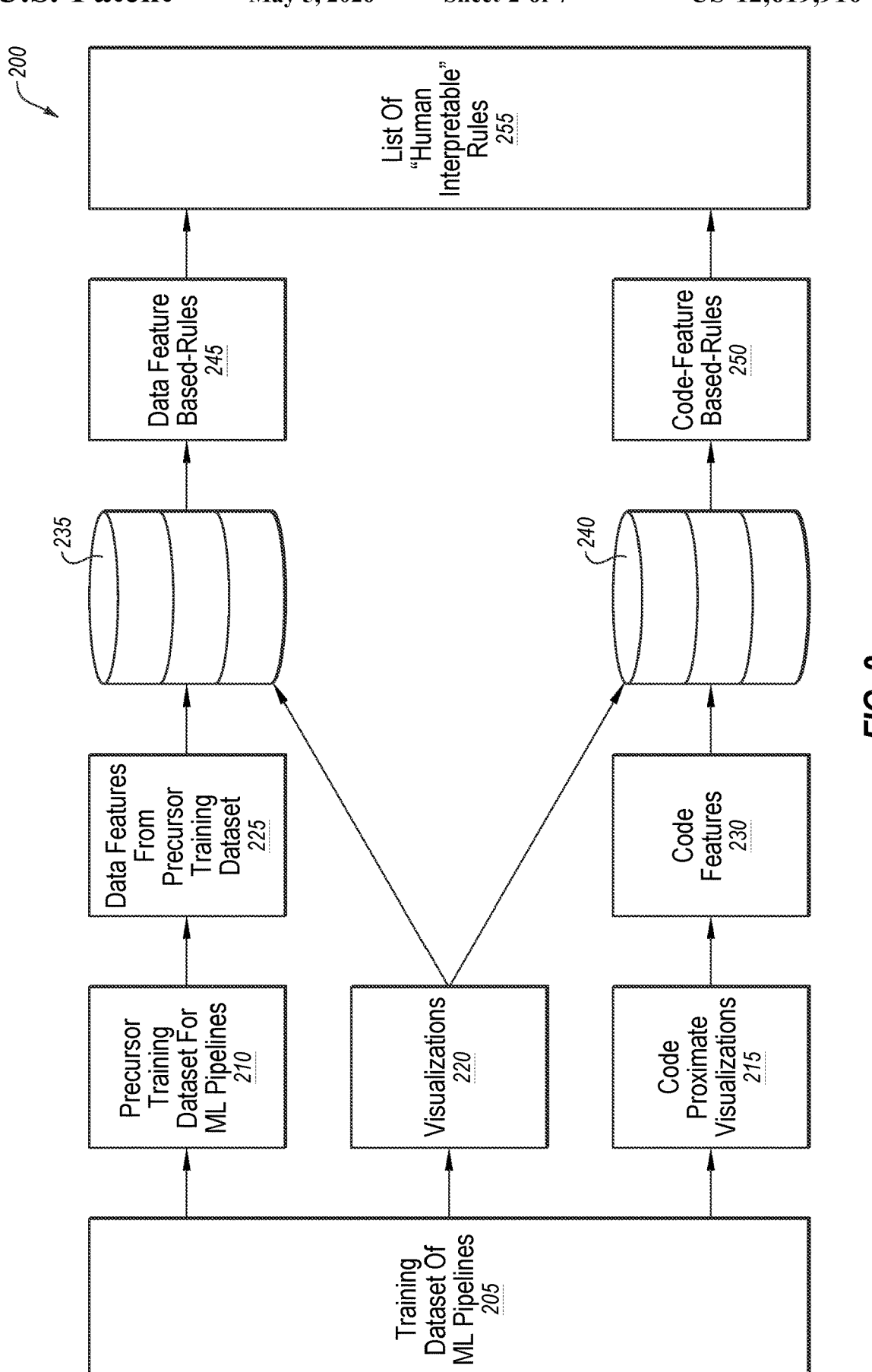
FIG. 2 illustrates an example environment for performing operations to prepare rules used in generating machine learning pipelines that include visualizations.

FIG. 2 illustrates an example environment 200 for performing operations to prepare rules used in generating machine learning pipelines that include visualizations, in accordance with one or more embodiments of the present disclosure.

The environment 200 may include a training dataset 205 that includes ML pipelines of known ML projects with visualizations. From the training dataset 205, precursor training datasets 210 may be identified that are used to train a respective ML pipeline from the training dataset 205. Additionally, visualizations 220 and code proximate the visualizations 220 may be identified. From the precursor training datasets 210, there may be data features 225 that are extracted from the precursor training datasets 210. From the code 215 proximate visualizations 220, code features 230 may be extracted. One example of extracting the code features 230 and/or the data features 225 is described in greater detail in FIG. 3. Correlations 235 between the data features 225 and the visualizations 220 may be stored, and correlations 240 between the code features 230 and the visualizations 220 may be stored. From the correlations 235 between the data features 225 and the visualizations 220, a set of data feature based-rules 245 may be derived. From the correlations 240 between the code features 230 and the visualizations 220, a set of code feature based-rules 250 may be derived. A combination of the data feature based-rules 245 and the code feature based-rules 250 may be stored and usable as a list of "human interpretable" rules 255. One example of the generation of such rules may be described with greater detail in reference to FIG. 5. The rules 255 may be used, for example, as the list of rules 120 of FIG. 1.

The training dataset 205 of ML pipelines may include ML pipelines that have been previously generated. In some embodiments, the ML pipelines may be limited to those that include visualizations. In some embodiments, the ML pipelines of the training dataset 205 may be obtained from one or more open source software (OSS) ML project databases, which may be large-scale repositories of existing ML projects. Some examples of large-scale repositories of existing ML projects 205 include, but are not limited to, Kaggle and GitHub. In these and other embodiments, the ML pipelines may be those rated above a threshold level (e.g., a threshold number of user ratings and/or an average score above a threshold amount).

The precursor training datasets 210 may include the datasets upon which the ML pipelines of the training dataset 205 are trained. For example, each of the ML pipelines in the training dataset 205 may identify the precursor training datasets 210 upon which they are trained.

The code 215 proximate the visualizations 220 may include the programming code that is near the commands to generate the visualizations 220 in the ML pipelines of the training dataset 205. In some embodiments, the code 215 may be in cells of a programmatic notebook just prior to or just after the commands to generate the visualizations 220. Additionally or alternatively, the code 215 may be within a threshold distance of the command to generate the visualizations 220, such as within a discrete value (e.g., threshold number) of lines of programmatic code, a threshold number of cells in a programmatic notebook, or other proximate conditions. Additionally or alternatively, the code 215 may be in cells with any distance of the command to generate the visualizations 220. In such a circumstance, the code 215 and the command to generate the visualizations 220 may have certain relations, determined by the same parameters used in both 215 or 220. For example, a parameter revised by code 215 may be used as the inputs for the command to generate the visualizations 220 and may be considered "proximate" the visualizations 220, even though the code 215 may be many lines of code away from the command to generate the visualizations 220.

The visualizations 220 may include any visualizations that are generated as part of the ML pipelines of the training dataset 205. The visualizations 220 may include a visualization command and parameters of the visualization command, which may represent what plot is used, and what data is plotted. Examples of such visualization commands may include hist(x), dist(x), scatterplot(x,y), histplot(x), countplot(x), among others, where x and y are example variables of what data is plotted.

The data features 225 may include data characteristics of the precursor training datasets 210. The data features 225 may include single column features and/or pairwise column features (e.g., features based on multiple columns). Examples of such data features 225 may be included in Tables 1 and 2 below, with Table 1 illustrating example single column features and Table 2 illustrating pair-wise features. As used herein, the term "target" may refer to the value or prediction which is sought to be obtained or predicted by the ML model defined in the ML pipeline. For example, referring to the Titanic example, the "target" may be the data field in the precursor training dataset that indicates whether a given individual did or did not survive on the Titanic.

TABLE 1

| Feature Type | Column Feature | Options for values | Type of data | Other Notes |
|---|---|---|---|---|
| Data Type Features | Column_data_type | string, numerical, categorical | categorical | |
| | Numerical_type | Integer, decimal, time | categorical | |
| | Num_of_category | | numeric | Number of categories in the column |
| | ML_data_type | Id, target | Categorical | The information such as target column, id column can be defined in task specification |

TABLE 1-continued

| Feature Type | Column Feature | Options for values | Type of data | Other Notes |
|---|---|---|---|---|
| Missing value features | has_none | | boolean | |
| | percentage_none | | numeric | |
| | num_none | | numeric | |
| Outlier features | percent_outliers_15iqr | | numeric | v < (q25 − 1.5 * iqr), v > (q75 + 1.5 * iqr) |
| | percent_outliers_3iqr | | numeric | |
| | percent_outliers_1_99 | | numeric | |
| | percent_outliers_3std | | numeric | v < (mean − 3 * std), v > (mean + 3 *sample_std)) |
| | has_outliers_15iqr | | boolean | |
| | has_outliers_3iqr | | boolean | |
| | has_outliers_1_99 | | boolean | |
| | has_outliers_3std | | boolean | |
| Distribution features | normality_statistic | | numeric | Check how differs from a normal distribution (Skewtest, kurtosi stest) |
| | normality_p | | numeric | P value |
| | is_normal_5 | | boolean | normality_p < 0.05 |
| | is_normal_1 | | boolean | normality_p < 0.01 |
| Statistical features | mean | | numeric | |
| | normalized_mean | | numeric | |
| | median | | numeric | |
| | normalized_median | | numeric | |
| | var | | numeric | |
| | std | | numeric | |
| | coeff_var | | numeric | coefficient of variation |
| | min | | numeric | |
| | max | | numeric | |
| | range | | numeric | |
| | normalized_range | | numeric | |
| | entropy | | numeric | a degree of randomness or uncertainty |
| | gini | | numeric | Gini coefficient of an array (e.g., as determined at https://github.com/ oliviaguest/gini) |
| | q25 | | numeric | 25% percentile |
| | q75 | | numeric | 75% percentile |
| | med_abs_dev | | numeric | median absolute deviation |
| | avg_abs_dev | | numeric | average absolute deviation |
| | quant_coeff_disp | | numeric | (q75 − q25)/ (q75 + q25) |
| | skewness | | numeric | measure of the asymmetry of the probability distribution |
| | kurtosis | | numeric | measure of the "tailedness" of the probability distribution |
| | moment_5 | | numeric | measure a distribution |
| | moment_6 | | numeric | |
| | moment_7 | | numeric | |
| | moment_8 | | numeric | |
| | moment_9 | | numeric | |
| | moment_10 | | numeric | |

TABLE 2

| Feature Type | Pairwise Feature | Options for values | Type of data | Other Notes |
|---|---|---|---|---|
| Data Type Features | Pairwise _column_ data_type | Numerical- categorical, categorical- numerical, decimal-decimal, etc. | categorical | |
| | Pairwise_ML_target | Numerical-Target, decimal-Target, etc. | categorical | One column is target, the other column is something else |
| Shared data features | has_shared_elements | | boolean | |
| | num_shared_elements | | numeric | |
| | percent_shared_elements | | numeric | |
| | identical | | boolean | |
| | has_shared_unique_ elements | | boolean | |
| | num_shared_unique_ elements | | numeric | |
| | percent_shared_unique_ elements | | numeric | |
| | identical_unique | | boolean | |
| Numerical- numerical pairwise features | correlation_value | | numeric | |
| | correlation_p | | numeric | |
| | correlation_ significant_005 | | boolean | |
| | ks_statistic | | numeric | |
| | ks_p | | numeric | |
| | ks_significant_005 | | boolean | |
| | percent_range_overlap | | numeric | |
| | has_range_overlap | | numeric | |
| String-String pairwise features | chi_sq_statistic | | numeric | chi-square statistic |
| | chi_sq_p | | numeric | |
| | chi_sq_significant_ 005 | | numeric | |
| Numerical-String pairwise features | one_way_anova_ statistic | | numeric | one-way ANOVA |
| | one_way anova_p | | numeric | |
| | one_way_anova_ significant_005 | | boolean | |

The code features 230 may include aspects of the code in relation to the visualizations. For example, the code features 230 may include an API call immediately before the visualization command to represent an explanation of functional blocks to be used in the ML pipeline. For example, the visualization may provide a visual explanation of why the immediately preceding functional block is used in the ML pipeline. As another example of the code features 230, the code features 230 may include an API call immediately after the visualization command to represent an exploration of the functional blocks to be used in the ML pipeline. For example, after observing the visualization of the precursor dataset 210, what is observed by the visualization leads to the choice of the next functional block in the ML pipeline. For example, after observing the visualization results of a boxplot showing the missing values, what is observed by the visualization leads to the choice of the next functional block in the ML pipeline, such as fillna( ) to facilitate filling the missing values.

The correlations 235 may represent relationships between the data features 225 and the visualizations 220, and the correlations 240 may represent relationships between the code features 230 and the visualizations 220.

The data feature based-rules 245 may represent a relationship between the date features 225 and the visualizations 220. The rule may include a conditional statement with an antecedent (the data feature) and a consequent (the visualization), with a numerical value representative of the probability that when the antecedent occurs, the consequent also occurs. Additionally or alternatively, the rule may account for lift, which may represent the likelihood of the consequent occurring with knowledge that the antecedent is present, rather than merely that it is present.

The code features based-rules 250 may be similar or comparable to the data feature based-rules 245, although based on the code features 230 rather than the data features 225.

The list of rules 255 may include rules that are stored or presented in a manner that is human readable. For example, the rules may be written with the antecedent, the consequent, and the confidence as a statement: If [antecedent] occurs, there is a [confidence] likelihood that [consequent] occurs. In such a statement, antecedent may be a data feature, a code feature, a combination of multiple data features, or a combination of multiple code features, consequent may include the visualizations (e.g., plot type and/or what data to plot), and confidence may represent the likelihood of the consequent occurring in the event of the antecedent occurring.

For each of FIGS. 3-6, the associated operations may be performed by any suitable system or device. For example, one or more operations of the operations depicted in FIGS. 3-6 may be performed by or directed for performance by the system 100, the visualization predictor 110, or other components of FIG. 1. Additionally or alternatively, the operations may be performed by a computing system such as the computing system 700 of FIG. 7.

Modifications, additions, or omissions may be made to FIGS. 3-6 without departing from the scope of the present disclosure. For example, the operations depicted in FIGS. 3-6 may include more or fewer operations than those illustrated and described in the present disclosure. Further, the order of the description of operations depicted in FIGS. 3-6 does not mean that the operations must be performed in the described order. In addition, in some instances, a same operation may be described with respect to different portions of the operations depicted in FIGS. 3-6, but in some instances may only be performed once and used for the different portions of the operations depicted in FIGS. 3-6.

Figure 3:
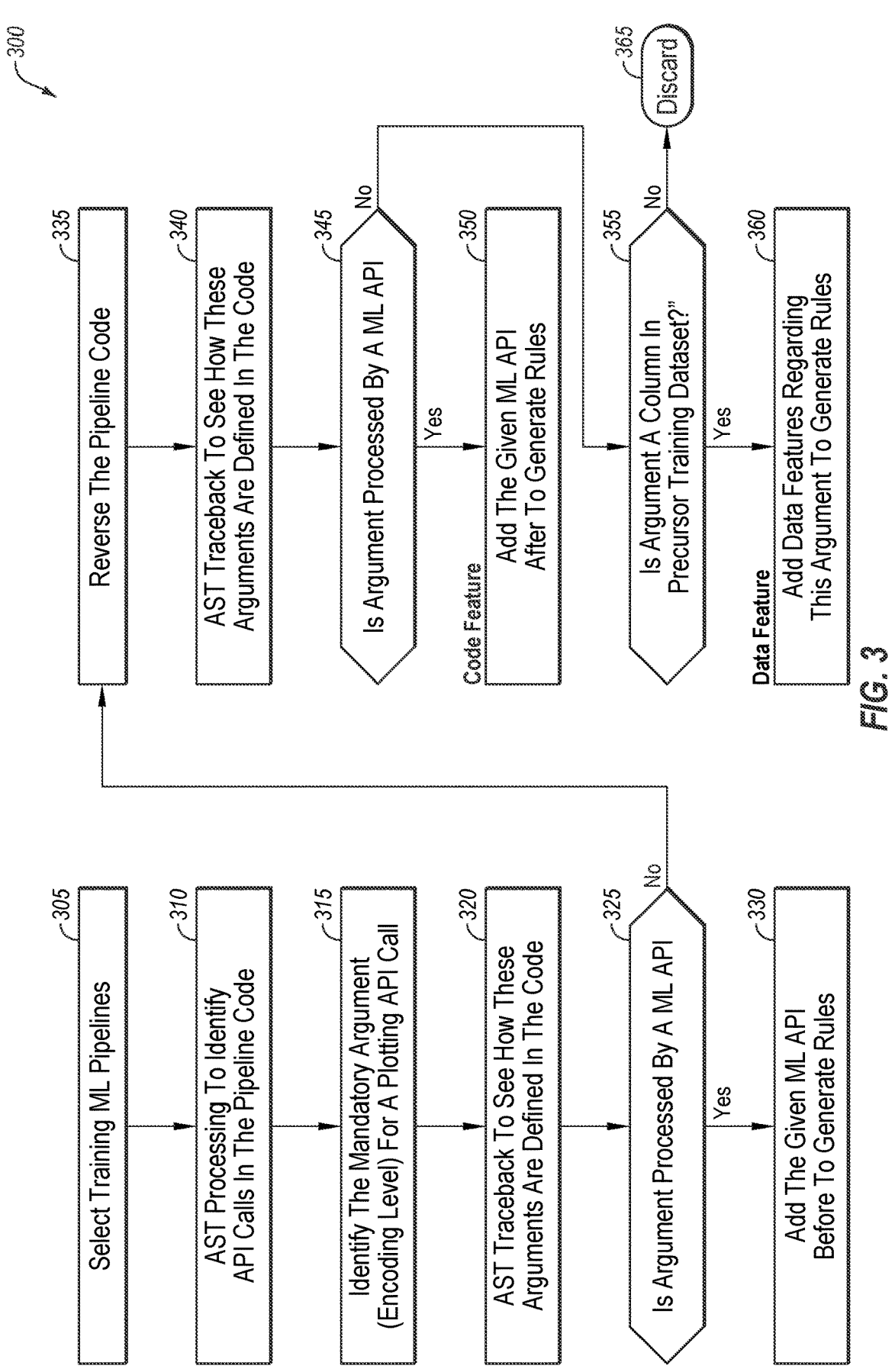
FIG. 3 is a flowchart of an example method of extracting coding features and data features from training machine learning pipelines.

FIG. 3 is a flowchart of an example method 300 of extracting coding features and data features from training machine learning pipelines, in accordance with one or more embodiments of the present disclosure.

At block 305, training ML pipelines may be selected as part of a training dataset. For example, a set of ML pipelines from Kaggle or GitHub that are highly rated and include visualizations may be selected.

At block 310, abstract syntax tree (AST) processing may be used to identify API calls in the code of the ML pipelines of the block 305. For example, the code of the ML pipelines may be parsed using AST to identify functional blocks as API calls within the ML pipeline.

At block 315, a mandatory argument may be identified for a plotting API call identified in the pipeline code. For example, if the API plotting call is plt.hist(y_classes), the code y_classes may be identified as the mandatory argument.

At block 320, an AST traceback may be used to see how the mandatory arguments are defined in the code. For example, the code may be parsed backwards from the plotting API to identify where the mandatory arguments are defined. Following the example above, the code may be parsed backwards from the plotting API to identify use of y_classes earlier than plt.hist(y_classes) in the code (e.g., the line y_classes=kmeans.predict(X) may be located just before the plotting command in the pipeline code).

At block 325, a determination may be made whether the mandatory argument of the block 315 is processed by an ML API in the ML pipeline before the plotting API call. If it is processed by an ML API, the method 300 may proceed to the block 330. If it is not processed by an ML API, the method 300 may proceed to the block 335. For the given example mentioned above, the ML API might be identified which is "Predict( )".

At block 330, the given ML API before the plotting API may be added to generate rules. For example, a statement may be generated with the plotting API as the consequent and the ML APIs being the antecedent. In some embodiments, if multiple arguments are used by the plotting API, all of the arguments being processed by the plotting API may be included to generate the rules. In these and other embodiments, the given ML API occurring before the plotting API call may be added as a code feature related to the visualization being used for explanation of the ML pipeline.

At block 335, the pipeline code may be reversed.

At block 340, an AST traceback may be used to see how the mandatory arguments are defined in the code in reverse. For example, by reversing the code and then performing the AST traceback, the arguments used in the plotting API call may be identified after the plotting API call.

At block 345, a determination may be made whether the argument is processed by the ML API, and may be similar or comparable to the block 325. If it is processed by the ML API, the method 300 may proceed to the block 350. If the ML API is not processed by the ML API, the method 300 may proceed to the block 355.

At block 350, the given ML API after the plotting API call may be added to generate rules. For example, the given ML API occurring after the plotting API call may be added as a code feature related to the visualization being used in exploration of the ML pipeline.

At block 355, a determination may be made to check whether the argument is a column in the precursor training dataset. If the argument is such a column, the method 300 may proceed to the block 360. If the argument is not such a column, the method 300 may proceed to the block 365.

At block 360, the data features may be added for generating rules. For example, the data features of the column may be added in conjunction with the visualization to facilitate generation of a rule related to the data feature and the visualization.

At block 365, the argument from the plotting API and/or the plotting API itself may be discarded. Stated another way, the plotting API may not be used in generating rules to facilitate predicting visualizations for a new ML pipeline.

Figure 4:
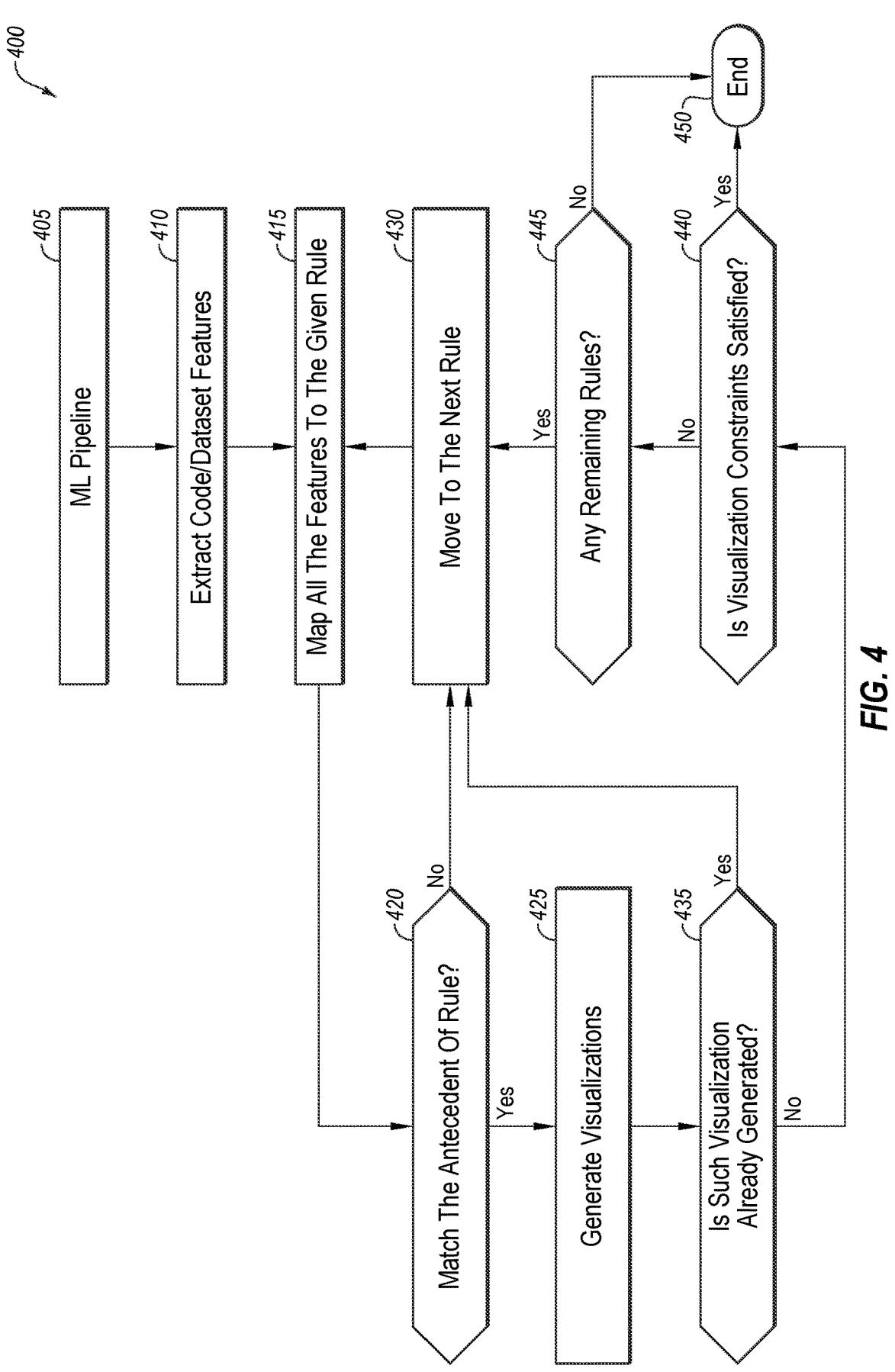
FIG. 4 is a flowchart of an example method of generating a machine learning pipeline that include visualizations.

FIG. 4 is a flowchart of an example method 400 of generating a machine learning pipeline that include visualizations, in accordance with one or more embodiments of the present disclosure.

At block 405, a new ML pipeline may be obtained. For example, the new ML pipeline may be the ML pipeline 105 of FIG. 1.

At block 410, code and/or dataset features of the new ML pipeline may be extracted. For example, the extraction of the code and/or dataset features may be similar or comparable to the method 300 of FIG. 3. While FIG. 3 is described with reference to training ML pipelines and/or precursor datasets, the same or a similar process may be undertaken to identify code features and/or dataset features for the new ML pipeline.

At block 415, all the code and/or dataset features may be mapped to a given rule. For example, the code and/or data set features may be compared to the given rule. In some embodiments, the given rule may be selected as the first rule in a list of rules (such as the list of rules 120 of FIG. 1). In some embodiments, the rules may be listed in order of confidence and/or lift. As another example, one or more rules with lower confidence may be included earlier in the list such that rules with lower confidence may be considered and/or included. For example, a given ML API may have all rules associated with it included higher in the list, even if the confidence is low.

At block 420, a determination may be made whether the code and/or dataset features match the antecedent of the given rule. If the features do match the antecedent of the given rule, the method 400 may proceed to the block 425. If the features do not match the antecedent of the given rule, the method 400 may proceed to the block 430.

At block 425, the visualization associated with the given rule may be generated. For example, the visualization may be generated based on the API visualization call as the visualization command (e.g., what kind of plot is to be generated), and the parameters of the API visualization command may be based on the given rule. In some embodiments, the block 425 may include embedding the visualization and/or the visualization command including the parameters within the new ML pipeline. In these and other embodiments, the visualization commands may be inserted just before or just after the associated functional block (e.g., ML API command) based on the given rule.

At block 430, the method 400 may proceed to a next rule to consider for visualizations. For example, the method 400 may go to the next rule in the list of rules. After the block 430, the method 400 may return to the block 415 to map the features to the next rule proceeded to at the block 430.

At block 435, after generating the visualization at the block 425, a determination may be made whether the visualization has already been generated. If it has already been generated, the method 400 may proceed to the block 430 to move to the next rule. If it has not already been generated, the method 400 may proceed to the block 440.

At block 440, a determination may be made whether visualization constraints are satisfied. Such visualization constraints may include a threshold number of visualizations to include in a given ML pipeline (e.g., such as limiting a number of visualizations to three). As another example, such visualization constraints may include limits on a number of types or styles of visualizations, a limit on a number of visualizations of a certain data field or data type, or other similar or related constraints. If the visualization constraints are met, the method 400 may proceed to the block 450 to end.

At block 445, a determination may be made whether there are any remaining rules which have not been analyzed. If there are rules remaining, the method 400 may proceed to the block 430. If there are no rules remaining, the method 400 may proceed to the block 450.

At block 450, the method 400 may end.

Figure 5:
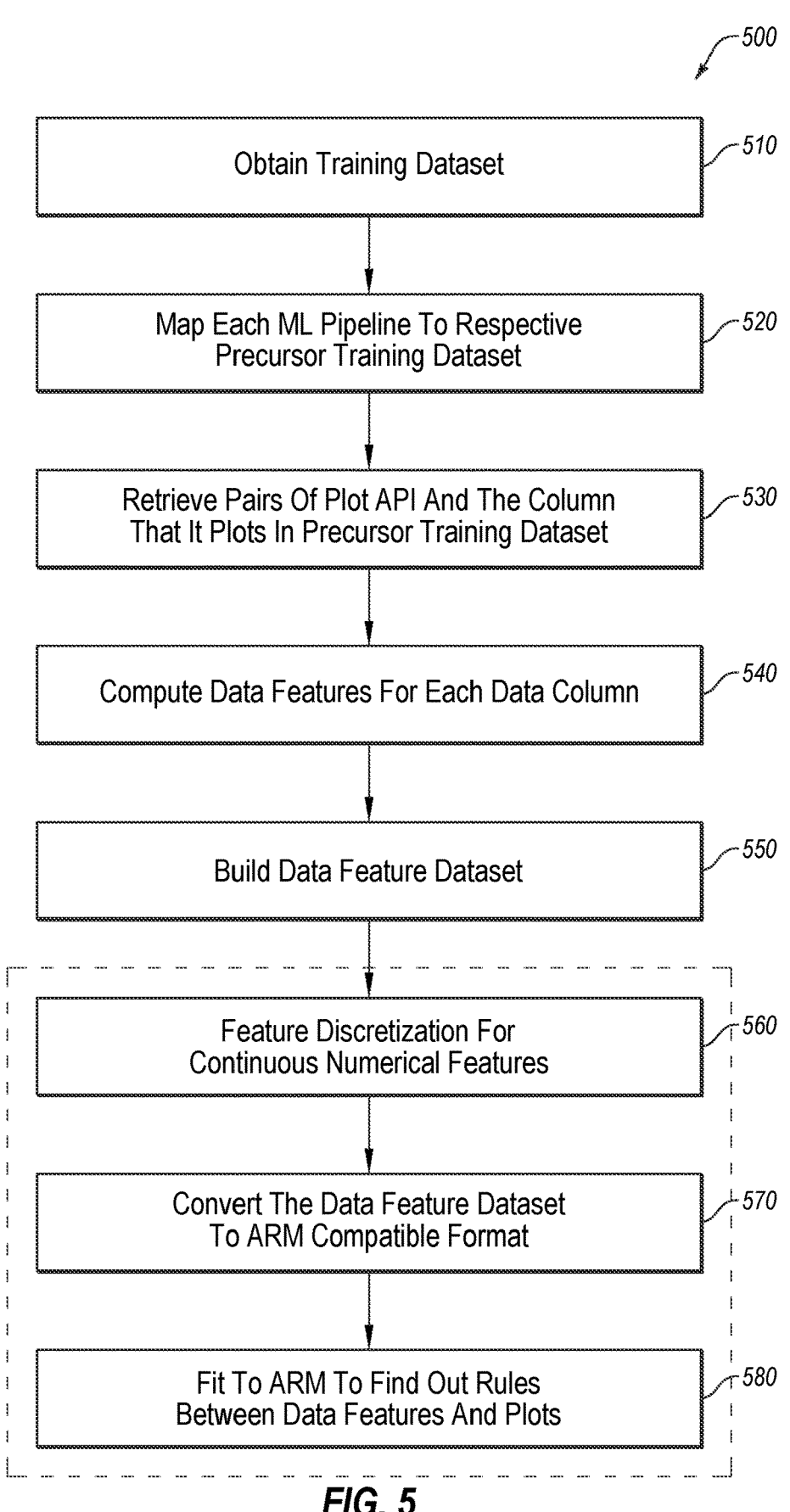
FIG. 5 is a flowchart of an example method of deriving rules related to visualizations.

FIG. 5 is a flowchart of an example method 500 of deriving rules related to visualizations, in accordance with one or more embodiments of the present disclosure.

At block 510, a training dataset may be obtained. For example, the training dataset may include a set of ML pipelines that are obtained that are highly rated and/or include visualizations. Such ML pipelines may be obtained from Kaggle, GitHub, or other project repositories.

At block 520, each ML pipeline of the training dataset may be mapped to a respective precursor training dataset. A given precursor dataset may be the dataset of information on which a respective ML pipeline of the training dataset is trained. For example, on the project page and/or in the code of the ML pipeline, the precursor training dataset may be identified.

At block 530, pairs of plotting APIs (e.g., visualization commands) and the column that it plots in the precursor training dataset may be retrieved. For example, the visualization command and the parameters thereof may be analyzed such that the data column that is visualized may be retrieved.

At block 540, data features for each data column may be computed. For example, the data features may correspond to aspects of the data in the columns and/or other aspects of the data, such as those described above in Tables 1 and 2.

At block 550, a data feature dataset may be built. For example, the data feature dataset may include a given plot API or other visualization command, the column(s) that are visualized, and/or the data features related to the visualized columns.

At block 560, features may be discretized for continuous numerical features. For example, some values in the columns may vary widely and include continuous numerical values. As shown in Table 1 and Table 2, there are many features in the data feature dataset that may be continuous numerical values. For such values, one or more approaches may be used to discretize the data such that, rather than a continuous set of numerals, discrete buckets or groups of values may be designated within which all of the data fits. For example, the continuous values may be discretized in an equal-width manner where a set number of buckets are generated and each bucket covers an equivalent numerical range. As another example, an equal-frequency approach may be undertaken where a set number of buckets is generated and covers a range such that each bucket includes an equivalent number of observations. As another example, a K-means approach (or other unsupervised machine learning clustering algorithms) may be undertaken to group the numerical features into different clusters. For example, where a set number of averages are determined, and buckets around the set number of averages may be utilized, or a set number of standard deviations from the average is used as one bucket, and outside of that range is used as two other buckets (above and below the central range).

By discretizing the data, the rules may more readily be applicable to new datasets. For example, the rules can then be applicable to a given range of values rather than trying to generate and/or apply rules from continuous values.

At block 570, the data feature dataset may be converted to an association rule mining (ARM) compatible format. For example, such an association rule may include an antecedent and the likelihood of a consequent based on the presence of the antecedent. In some embodiments, such rules may be included in an ARM training dataset, which may be based on the data feature dataset.

At block 580, the converted data feature dataset may be fit to the ARM processing to find out rules between the data features and the plots. For example, the ARM processing may analyze the variety of data feature dataset and/or the visualizations to generate rules that articulate the relationships between the various data features and the inclusion of the visualizations. Stated another way, the block 580 may analyze which data features repeatedly occurred in relation to a given visualization such that the relationship may be articulated as a rule (e.g., when a column of the data set included the target for which the ML pipeline was designed to solve, that column (the target) was nearly always plotted with a histogram of the value).

In some embodiments, the blocks 560, 570, and/or 580 may operate together to perform the ARM process to determine the rules that are to be generated from the data features.

Figure 6:
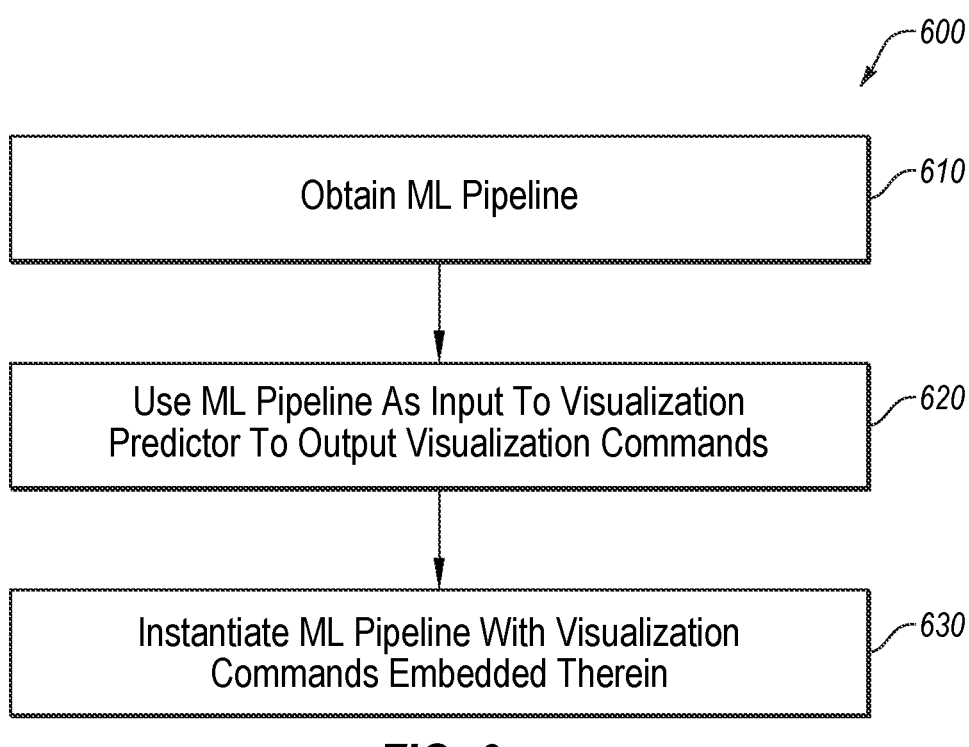
FIG. 6 is a flowchart of another example method of generating a machine learning pipeline that include visualizations.

FIG. 6 is a flowchart of another example method 600 of generating a machine learning pipeline that include visualizations, in accordance with one or more embodiments of the present disclosure.

At block 610, a ML pipeline may be obtained. For example, the ML pipeline may be a new ML pipeline generated by an automatic ML pipeline generating tool that generates a series of functional blocks to perform a ML task. As another example, the ML pipeline obtained at the block 610 may include a ML pipeline designed and/or generated manually by a data scientist or other user, and they may seek to add visualizations to enhance or improve their ML pipeline.

At block 620, the ML pipeline may be used as the input to a visualization predictor that is configured to output visualization commands. For example, the ML pipeline may be analyzed by the visualization predictor and the visualization predictor may output a series of visualization commands (e.g., the API call to invoke a particular visualization and/or the parameters on which the API call is to act). In some embodiments, the block 620 may include identifying a location within the ML pipeline where the visualization command is to be located (e.g., just before or just after the code feature with which the visualization command may be associated).

At block 630, the ML pipeline may be instantiated with the visualization commands embedded within the ML pipeline. For example, the visualization commands with the associated parameters may be embedded at the locations identified at the block 620 such that an entire ML pipeline with additional plotting API calls (e.g., visualization commands) included in the updated ML pipeline. In some embodiments, the updated ML pipeline may be stored as a Jupyter Notebook or other programmatic notebook, Python programming code including the visualization commands embedded within the code, or as any other computer-readable and/or human readable programming code with the visualization commands included.

Figure 7:
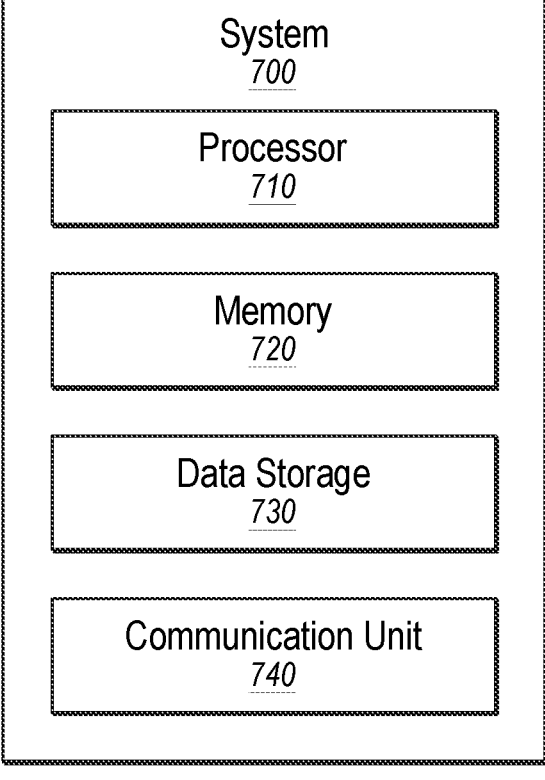
FIG. 7 illustrates a block diagram of an example computing system.

FIG. 7 illustrates a block diagram of an example computing system 700, according to at least one embodiment of the present disclosure. The computing system 700 may be configured to implement or direct one or more operations associated with a visualization predictor (e.g., the system 100 and/or the visualization predictor of FIG. 1). The computing system 700 may include a processor 710, a memory 720, and a data storage 730. The processor 710, the memory 720, and the data storage 730 may be communicatively coupled.

In general, the processor 710 may include any suitable special-purpose or general-purpose computer, computing entity, or processing device including various computer hardware or software modules and may be configured to execute instructions stored on any applicable computer-readable storage media. For example, the processor 710 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 7, the processor 710 may include any number of processors configured to, individually or collectively, perform or direct performance of any number of operations described in the present disclosure. Additionally, one or more of the processors may be present on one or more different electronic devices, such as different servers.

In some embodiments, the processor 710 may be configured to interpret and/or execute program instructions and/or process data stored in the memory 720, the data storage 730, or the memory 720 and the data storage 730. In some embodiments, the processor 710 may fetch program instructions from the data storage 730 and load the program instructions in the memory 720. After the program instructions are loaded into memory 720, the processor 710 may execute the program instructions. For example, the processor 710 may cause the computing system 700 to perform one or more of the operations associated with generating rules to be used by a visualization predictor. As another example, the processor 710 may cause the computing system 700 to perform one or more of the operations associated with generating a ML pipeline with visualizations.

The memory 720 and the data storage 730 may include computer-readable storage media for carrying or having computer-executable instructions or data structures stored thereon. Such computer-readable storage media may include any available media that may be accessed by a general-purpose or special-purpose computer, such as the processor 710. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 710 to perform a certain operation or group of operations.

Modifications, additions, or omissions may be made to the computing system 700 without departing from the scope of the present disclosure. For example, in some embodiments, the computing system 700 may include any number of other components that may not be explicitly illustrated or described.

As indicated above, the embodiments described in the present disclosure may include the use of a special purpose or general purpose computer including various computer hardware or software modules, as discussed in greater detail below. Further, as indicated above, embodiments described in the present disclosure may be implemented using computer-readable media for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. This interpretation of the phrase "A or B" is still applicable even though the term "A and/or B" may be used at times to include the possibilities of "A" or "B" or "A and B."

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method, comprising:
obtaining a machine learning (ML) pipeline including a plurality of functional blocks within the ML pipeline;
using the ML pipeline as an input to a visualization predictor, the visualization predictor trained to output one or more visualization commands based on relationships between the visualization commands and the functional blocks within the ML pipeline;
instantiating the ML pipeline with the one or more visualization commands embedded within the ML pipeline; and
generating the visualization predictor, generating the visualization predictor comprising:
obtaining a plurality of training ML pipelines as a training dataset, each of the training ML pipelines including at least one visualization,
determining first correlations between data features of precursor training datasets which are used to train the training ML pipelines and the at least one visualization,
determining second correlations between code features of the training ML pipelines and the at least one visualization, and
deriving a plurality of rules based on the first correlations and the second correlations, the rules providing a basis for predicting the visualization commands.
2. The method of claim 1, wherein deriving the plurality of rules includes applying association rule mining to the first correlations and the second correlations such that each of the rules includes a statement describing a relationship between one or more of the data features or the code features and a given visualization, and a confidence value of the relationship.

3. The method of claim 2, wherein the relationship includes a given code feature, the method further comprising:
determining the given code feature occurs after the given visualization in the ML pipeline; and
classifying an associated rule as explanatory in response to determining that the given code feature occurs after the given visualization and as exploratory if the given code feature occurs before the visualization.
4. The method of claim 3, wherein the given code feature has a relationship with a command to generate the given visualization.
5. The method of claim 2, further comprising discretizing a numerical feature of an association rule mining (ARM) training dataset to one of a limited number of buckets.
6. The method of claim 2, further comprising selecting a threshold number of rules with the confidence value below a threshold.
7. The method of claim 1, wherein the data features of the precursor training datasets include one or more meta-features of the precursor training datasets for one column of the precursor training datasets or one or more meta-features of the precursor training datasets for multiple columns of the precursor training datasets.
8. The method of claim 1, wherein using the ML pipeline as input to the visualization predictor comprises:
extracting run time code features in the ML pipeline and run time dataset features in a run time training dataset associated with the ML pipeline; and
mapping the run time code features and the run time dataset features to rules based on the relationships.
9. The method of claim 1, wherein a quantity of visualization commands is limited by a visualization constraint.
10. One or more non-transitory computer-readable media containing instructions which, when executed by one or more processors, cause a system to perform operations, the operations comprising:
obtaining a machine learning (ML) pipeline including a plurality of functional blocks within the ML pipeline;
using the ML pipeline as an input to a visualization predictor, the visualization predictor trained to output one or more visualization commands based on relationships between the visualization commands and the functional blocks within the ML pipeline;
instantiating the ML pipeline with the one or more visualization commands embedded within the ML pipeline; and
generating the visualization predictor, generating the visualization predictor comprising:
obtaining a plurality of training ML pipelines as a training dataset, each of the training ML pipelines including at least one visualization;
determining first correlations between data features of precursor training datasets which are used to train the training ML pipelines and the at least one visualization;
determining second correlations between code features of the training ML pipelines and the at least one visualization; and
deriving a plurality of rules based on the first correlations and the second correlations, the rules providing a basis for predicting the visualization commands.
11. The one or more non-transitory computer-readable media of claim 10, wherein deriving the plurality of rules includes applying association rule mining to the first correlations and the second correlations such that each of the rules includes a statement describing a relationship between one or more of the data features or the code features and a given visualization, and a confidence value of the relationship.

12. The one or more non-transitory computer-readable media of claim 11, wherein the relationship includes a given code feature, the operations further comprise:

determining the given code feature occurs after the given visualization in the ML pipeline; and classifying an associated rule as explanatory in response to determining that the given code feature occurs after the given visualization.

13. The one or more non-transitory computer-readable media of claim 12, wherein the given code feature has a relationship with a command to generate the given visualization.

14. The one or more non-transitory computer-readable media of claim 11, wherein the operations further comprise discretizing a numerical feature of an association rule mining (ARM) training dataset to one of a limited number of buckets.

15. The one or more non-transitory computer-readable media of claim 11, wherein the operations further comprise further comprising selecting a threshold number of rules with the confidence value below a threshold.

16. The one or more non-transitory computer-readable media of claim 10, wherein the data features of the precursor training datasets include one or more meta-features of the precursor training datasets for one column of the precursor training datasets or one or more meta-features of the precursor training datasets for multiple columns of the precursor training datasets.

17. The one or more non-transitory computer-readable media of claim 10, wherein using the ML pipeline as input to the visualization predictor comprises:

extracting run time code features in the ML pipeline and run time dataset features in a run time training dataset associated with the ML pipeline; and mapping the run time code features and the run time dataset features to rules based on the relationships.

18. The one or more non-transitory computer-readable media of claim 10, wherein a quantity of visualization commands is limited by a visualization constraint.

* * * * *